(12) United States Patent
Hofmann

(10) Patent No.: US 7,896,418 B2
(45) Date of Patent: Mar. 1, 2011

(54) COVERING FOR A GAP

(75) Inventor: Peter Hofmann, Neuhausen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 220 days.

(21) Appl. No.: 12/169,003

(22) Filed: Jul. 8, 2008

(65) Prior Publication Data
US 2009/0015030 A1    Jan. 15, 2009

(30) Foreign Application Priority Data
Jul. 13, 2007  (DE) .................. 10 2007 032 727

(51) Int. Cl.
*B60R 5/04*    (2006.01)
(52) U.S. Cl. ............... 296/37.16; 296/24.34
(58) Field of Classification Search ............ 296/136.01, 296/136.04, 24.44, 24.43, 37.1, 37.16, 24.4
See application file for complete search history.

(56) References Cited

U.S. PATENT DOCUMENTS 7,000,792 B2 * 2/2006 Arai ...................... 215/237
7,080,867 B2   7/2006 Woerner et al.

FOREIGN PATENT DOCUMENTS

| DE | 19537768 C1 | 11/1996 |
|---|---|---|
| DE | 101 09 651 A1 | 9/2002 |
| DE | 103 35 055 A1 | 3/2005 |
| DE | 20 2006 019 913 U1 | 6/2007 |
| EP | 1749699 A1 | 2/2007 |
| FR | 2895711 A1 | 7/2007 |
| GB | 2431905 A | 5/2007 |
| JP | 200688934 A | 4/2006 |
| JP | 2006264627 A | 10/2006 |
| JP | 2006306147 A | 11/2006 |

OTHER PUBLICATIONS

German Patent and Trademark Office Search Report, dated Feb. 15, 2008.
European Search Report dated Aug. 26, 2010.

* cited by examiner

*Primary Examiner*—Glenn Dayoan
*Assistant Examiner*—Melissa A Black

(57) ABSTRACT

A covering is provided for a gap behind at least one rear seatback in a motor vehicle, which gap is provided in the transverse direction of the vehicle between the rear seatback and a luggage compartment covering. The covering has at least one covering flap which is held in position on a housing of the luggage compartment covering, is mounted pivotably about a hinge and, in a use position, bears under prestress against the rear seatback. An integrated receptacle for the hinge of the covering flap is provided on an upper and, as seen in the direction of travel, front region of the housing of the luggage compartment covering.

7 Claims, 3 Drawing Sheets

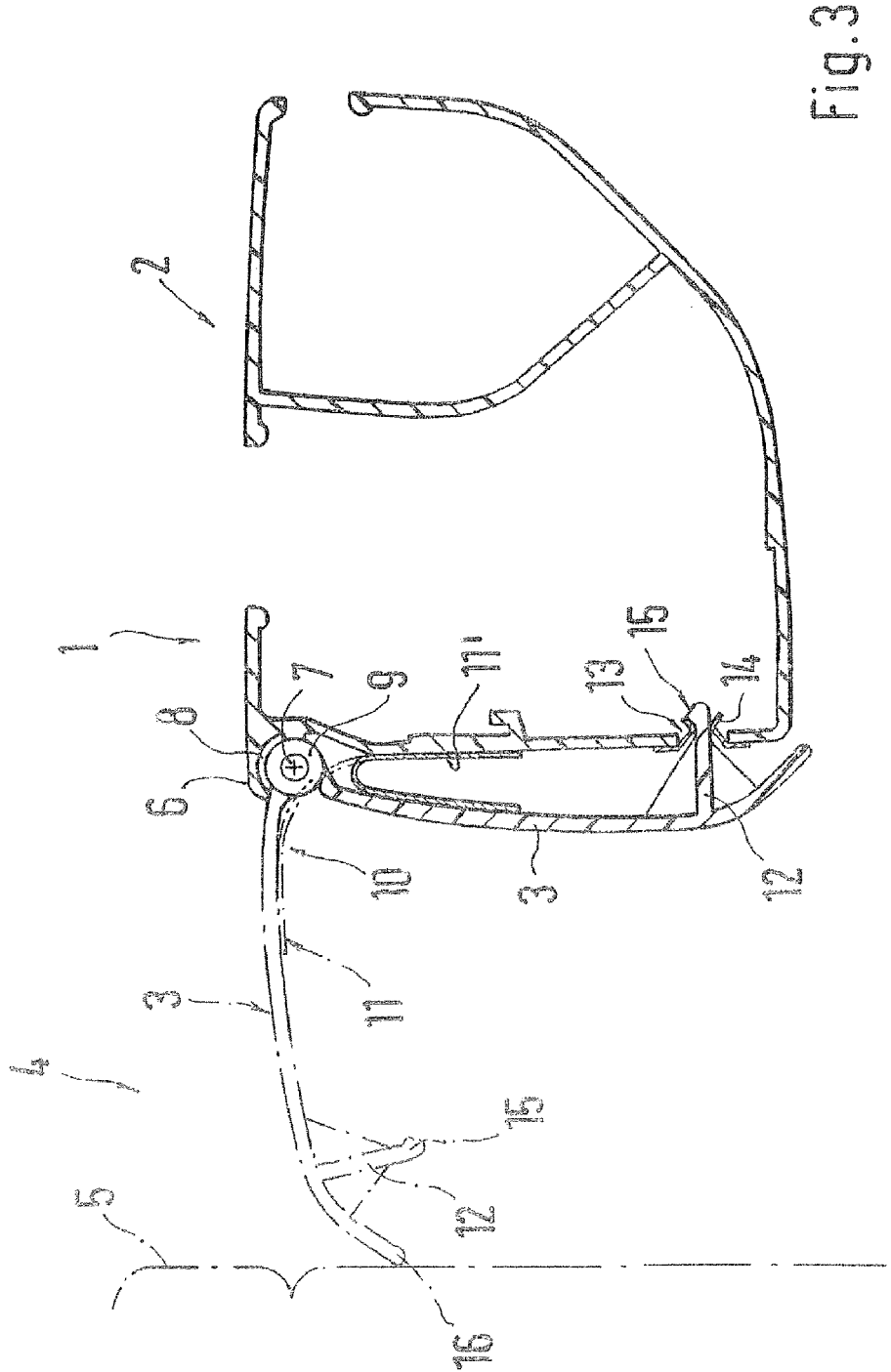

COVERING FOR A GAP

CROSS-REFERENCE TO RELATED APPLICATION

This application claims the priority, under 35 U.S.C. §119, of German application DE 10 2007 032 727.9, filed Jul. 13, 2007; the prior application is herewith incorporated by reference in its entirety.

BACKGROUND OF THE INVENTION

Field of the Invention

The present invention relates to a covering for a gap behind at least one rear seatback in a motor vehicle, which gap is provided in the transverse direction of the vehicle between the rear seatback and a luggage compartment covering. The invention also relates to a motor vehicle equipped with a covering of this type.

Station-wagon-type vehicles, in particular, frequently have displaceable and/or foldable rear seats in order to be able to increase a luggage compartment located behind them. In addition, the vehicles normally have a luggage compartment covering which, in the rearmost position—as seen in the direction of travel—of the rear seats in the longitudinal direction of the vehicle, is adjacent to the rear side of the rear seatback. Between the rear seatback and a front edge of the luggage compartment covering there is a gap which is of greater or lesser width depending on the position of the rear seatback in the longitudinal direction of the vehicle.

Published, German patent application DE 103 35 055 A1, corresponding to U.S. Pat. No. 7,080,867, discloses a covering for a gap of this type, the covering having a covering flap and a resetting device. The covering flap is coupled—as seen in the direction of travel—by a hinge to a front edge of the luggage compartment covering or to a hinge carrier attached to the luggage compartment covering. The resetting device produces a counterforce which has to be overcome in order to pivot the covering flap out of the at least approximately horizontal basic position in which it projects toward the rear seatback. Therefore a covering which does not have any components connected fixedly to the rear seatback can be provided.

SUMMARY OF THE INVENTION

It is accordingly an object of the invention to provide a covering for a gap which overcomes the above-mentioned disadvantages of the prior art devices of this general type, which is distinguished in particular by a compact construction.

With the foregoing and other objects in view there is provided, in accordance with the invention, a covering for a gap residing behind at least one rear seatback in a motor vehicle. The gap runs in a transverse direction of the vehicle between the rear seatback and a luggage compartment covering. The covering contains at least one covering flap held in position on a housing of the luggage compartment covering. The covering flap has a hinge and is mounted pivotably about the hinge. The covering flap, in a use position, bears under prestress against the rear seatback. An integrated receptacle for receiving the hinge of the covering flap. The integrated receptacle is disposed on an upper and, as seen in a direction of travel, front region of the housing of the luggage compartment covering.

The invention is based on the general concept of integrating, in a luggage compartment covering, a hinge for a covering flap, which covers a gap behind at least one rear seatback in a motor vehicle, in an upper and, as seen in the direction of travel, front region of the housing of the luggage compartment covering, to be precise in such a manner that the covering flap, in its not-in-use position, bears tightly against the housing of the luggage compartment covering and, as a result, is constructed very compactly. In this case, the covering flap is mounted on the housing of the luggage compartment covering in a manner such that it can pivot about the hinge and can be displaced between a use position, in which it is prestressed against the rear seatback positioned in front of it in the direction of travel, and a not-in-use position, in which it bears tightly against the housing of the luggage compartment covering. The covering according to the invention therefore satisfies the primary purpose demanded of it, namely of being able to reliably cover the gap behind at least one rear seatback in a motor vehicle, to be precise irrespective of the position of the rear seatback. At the same time, the covering according to the invention is distinguished in the removed state by requiring particularly little construction space, thereby significantly simplifying handling.

At least one spring device is expediently provided for prestressing the covering flap in the use position thereof, the spring device firstly being supported on a side of the covering flap which faces the luggage compartment covering in the not-in-use position of the covering flap, i.e. on an inner side of the covering flap, and secondly on the housing of the luggage compartment covering. By the spring device, reliable covering of the gap between the rear seatback and the luggage compartment covering is provided and at the same time infinitely variable adaptation of the covering flap to different rear seatback positions is possible. In this case, the covering flap may, of course, be of a multi-part configuration and therefore be adapted individually to the rear seatback arranged in front of it in each case. In addition, automatic closure of the gap between the luggage compartment covering and the rear seatback is provided by the spring device, and therefore, when the luggage compartment covering is fitted correctly, a gap is always reliably closed.

The covering flap expediently bears in its not-in-use position against the housing of the luggage compartment covering and can be locked in this position. The bearing of the covering flap against the housing of the luggage compartment covering ensures that not much construction space is required when the covering flap is in its not-in-use position. By the covering flap being able to be locked in its not-in-use position, an inadvertent swinging upward of the covering flap, which is accelerated, for example, by the spring device, is reliably prevented, and therefore the compact shape can be reliably retained while the luggage compartment covering is in the removed state.

In a further advantageous embodiment of the solution according to the invention, a latching edge is arranged on the covering flap and, when the covering flap is in its not-in-use position, engages in a latching groove on the housing or engages behind a latching contour on the housing. Such a latching of the covering flap in its not-in-use position provides a simple possibility of reliably holding the covering flap in its not-in-use position counter to the spring prestressing. At the same time, such latching connections constitute connections which are extremely simple to operate, and therefore, when the covering flap is transferred from the not-in-use position into the use position thereof, only one latching resistance has to be overcome and, for example, other locking elements do not have to be released.

In a further advantageous embodiment of the solution according to the invention, the covering flap is formed from the same material as a housing of the luggage compartment covering. This affords the advantage in particular that both the covering flap and the luggage compartment covering have an identical coefficient of thermal expansion, which is highly advantageous in view of the great temperature fluctuations which occur in a vehicle interior. At the same time, a uniform design between the covering flap and luggage compartment covering or the housing thereof can be achieved by this embodiment, thus enabling the esthetic impression to be enhanced.

It goes without saying that the features mentioned above and those which have yet to be explained below can be used not only in the respectively stated combination but also in different combinations or on their own without departing from the scope of the present invention.

Preferred exemplary embodiments of the invention are illustrated in the drawings and are explained in more detail in the description below, with the same reference numbers referring to identical or similar or functionally identical components.

Other features which are considered as characteristic for the invention are set forth in the appended claims.

Although the invention is illustrated and described herein as embodied in a covering for a gap, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a diagrammatic, sectional view of the second embodiment of the covering but with a different spring device.

DETAILED DESCRIPTION OF THE INVENTION

Figure 1:
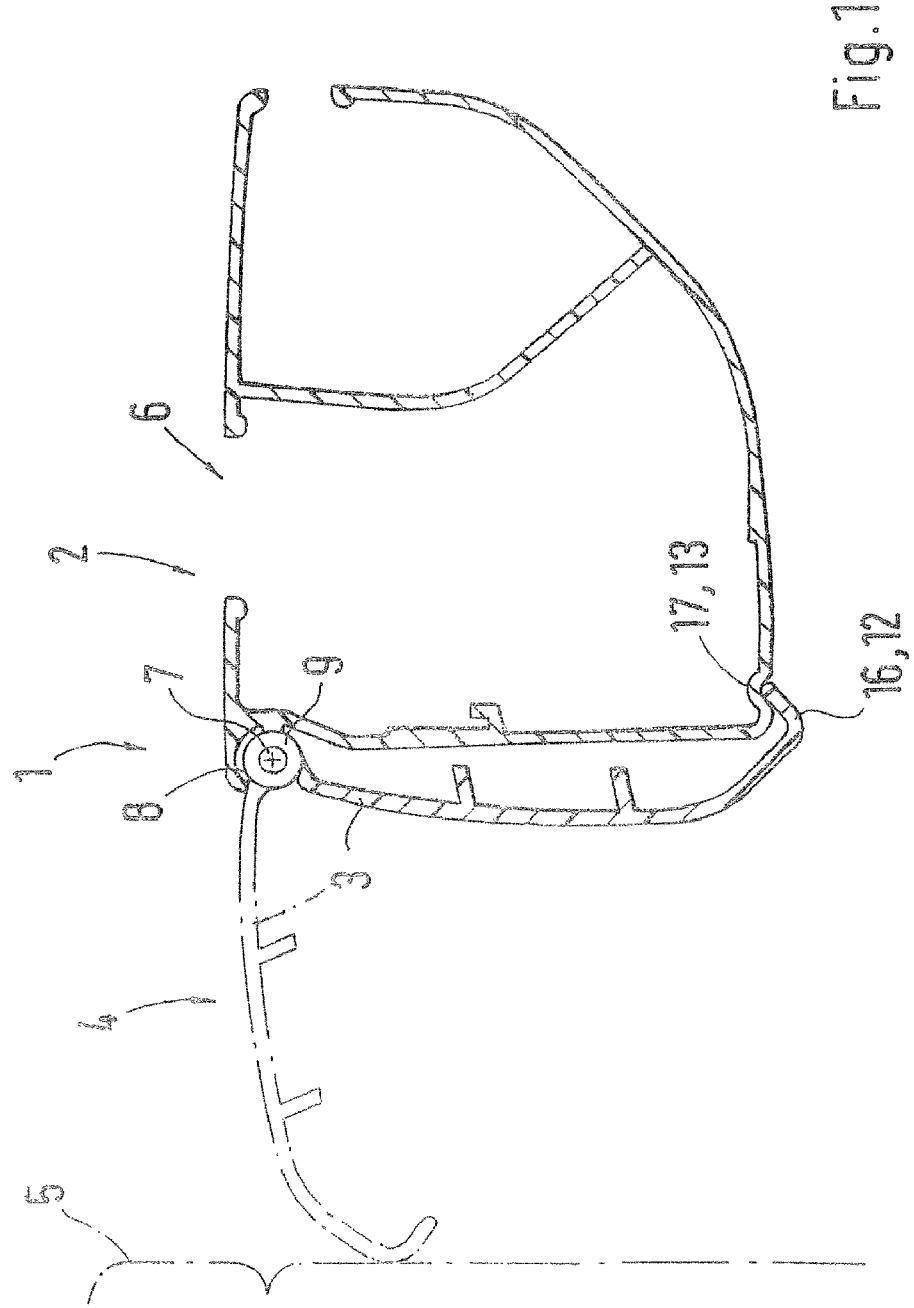
FIG. 1 is a diagrammatic, sectional view through a first embodiment of a covering according to the invention.
Figure 2:
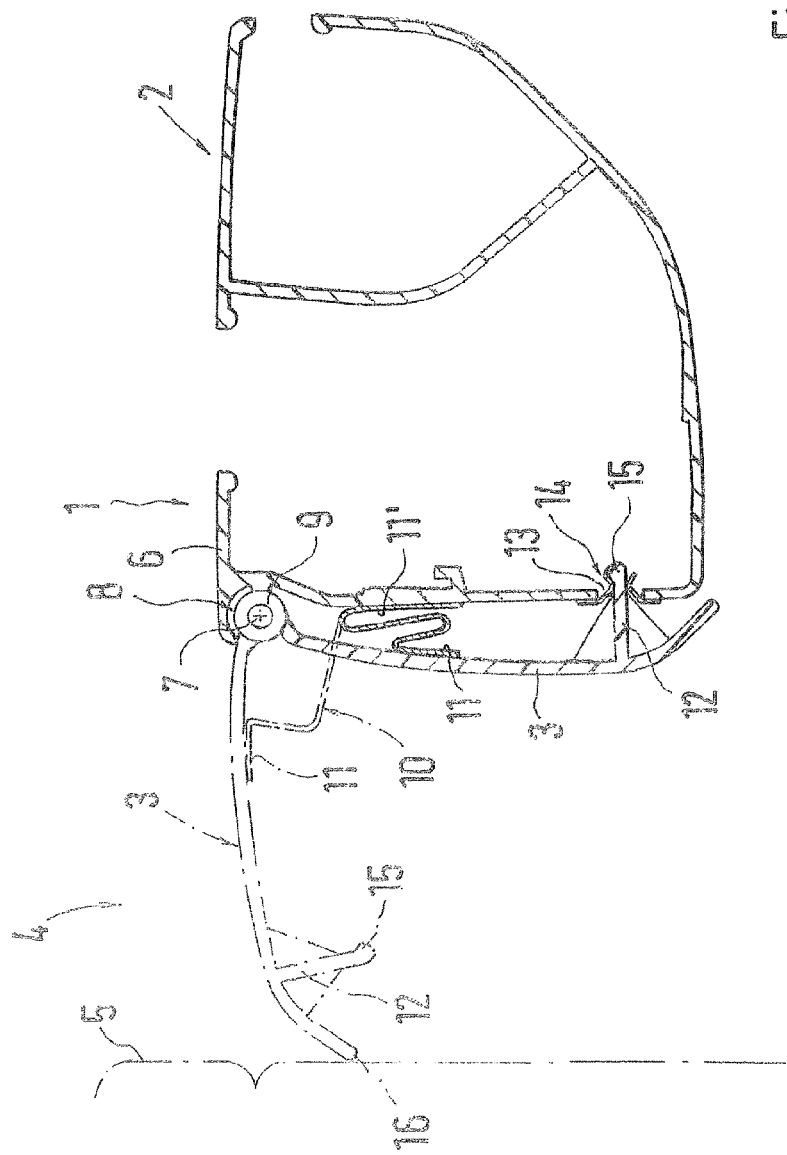
FIG. 2 is a diagrammatic, sectional view of a second embodiment of the covering.

Referring now to the figures of the drawing in detail and first, particularly, to FIG. 1 thereof, there is shown a covering 1 according to the invention that has a covering flap 3 which is mounted in an articulated manner on a luggage compartment covering 2. By use of the covering 1, covering of a gap 4 behind at least one rear seatback 5 in a vehicle is possible, the gap 4 running in the transverse direction of the vehicle between the rear seatback 5 and the luggage compartment covering 2. The luggage compartment covering 2 has a housing 6 in which usually a roller blind which covers a loading compartment positioned in the direction of travel behind the luggage compartment covering 2 is mounted. Generally, the covering flap 3 is shown in FIGS. 1 to 3 in each case in a possible use position and a possible not-in-use position, with it being possible to see that the covering flap 3 is arranged in its not-in-use position closely adjacent to the housing 6 of the luggage compartment covering 2.

In order to cover the gap 4 located between the luggage compartment covering 2 and the rear seatback 5, the covering flap 3 can be rotated about an axis of rotation 7 running in the transverse direction of the vehicle. In this case, the covering flap 3 can generally be displaced between a use position, in which it bears under prestress against the rear seatback, and a not-in-use position, in which it bears against the housing 6 of the luggage compartment covering 2. In the case of the covering 1 according to the invention, an integrated receptacle 8 for a hinge 9 of the covering flap 3 is provided on an upper and, seen in the direction of travel, front region of the housing 6 of the luggage compartment covering 2.

In order to be able to allow the covering flap 3 to bear against the rear seatback 5 under prestress, at least one spring device 10 is provided which firstly is supported on a side of the covering flap 3 which faces the luggage compartment covering 2 in the not-in-use position of the covering flap 3, i.e. on an inner side of the covering flap 3, and secondly on the housing 6 of the luggage compartment covering 2. A spring device 10 of this type is shown, for example, in FIGS. 2 and 3.

Of course, the covering flap 3 can also be of a multi-part configuration in the transverse direction of the vehicle, and therefore the gap 4 can be covered in a manner which can be adapted individually to a position of the rear seatback 5 located in each case in front of it. In this case, the gap 4 which is of greater or lesser size, is produced between the rear seatback 5 and the luggage compartment covering 2, depending on the position of the shiftable rear seatback 5, and therefore the covering 1 has to react flexibly thereto.

According to FIGS. 2 and 3, the at least one spring device 10 has two spring legs 11 and 11', the one spring leg 11 of which is supported on the inner side of the covering flap 3 and the other spring leg 11' of which is supported on the housing 6 of the luggage compartment covering 2. In this case, the spring device 10 can be constructed as a foldable spring device 10, as shown for example in FIG. 2, or as a simple leg spring, as shown in FIG. 3. Of course, other types of spring (simple torsion springs in various suitable coil shapes) are likewise conceivable.

In order to remove the luggage compartment covering 2 from the motor vehicle, it is desirable for the covering flap 3 to bear in its not-in-use position as flat as possible against the housing 6 of the luggage compartment covering 2 and to be lockable in this position. In this case, locking can take place, for example, via a latching element 12 disposed on the inner side of the covering flap 3, in particular via a latching head 15, which, for locking the covering flap 3 in the not-in-use position, interacts with a mating latching element 13 arranged on the housing 6 of the luggage compartment covering 2, in particular with a latching opening, as shown in FIGS. 2 and 3, or engages therein. In this case, the mating latching element 13 configured as a latching opening can have at least one spring element 14 which, when the covering flap 3 is in the not-in-use position, engages behind the latching head 15 provided on the latching element 12 and therefore fixes it in the latching opening.

An additional or alternative embodiment to this is shown in FIG. 1, in which a latching edge 16 is arranged on the covering flap 3 and, when the covering flap 3 is in its not-in-use position, engages in a latching groove 17 on the housing or engages behind the latching contour on the housing.

By of the integrated receptacle 8 for the hinge 9 of the covering flap 3 in the housing 6 of the luggage compartment covering 2, a very compact construction can be achieved, which is particularly advantageous if the luggage compartment covering 2 is removed from the motor vehicle. In this case, the covering flap 3 can be locked in a manner bearing closely adjacent to the housing 6 and, as a result, considerably reduces the space required by the luggage compartment covering.

The invention claimed is:

1. A covering for a gap residing behind at least one rear seatback in a motor vehicle, the gap running in a transverse direction of the vehicle between the rear seatback and a luggage compartment covering, the covering comprising:

at least one covering flap held in position on a housing of the luggage compartment covering, said covering flap having a hinge and mounted pivotably about said hinge, said covering flap, in a use position, bearing under prestress against the rear seatback;

an integrated receptacle for receiving said hinge of said covering flap, said integrated receptacle disposed on an upper, front region of the housing of the luggage compartment covering;

at least one spring device prestressing said covering flap in the use position thereof, said spring device being firstly supported on an inner side of said covering flap facing the luggage compartment covering in a retracted position of said covering flap, and secondly on the housing of the luggage compartment covering;

said covering flap bearing in the retracted position against the housing of the luggage compartment covering and being locked in the retracted position; and said covering flap having a latching edge and, when said covering flap is in the retracted position, said latching edge one of engages in a latching groove on the housing and engages behind a latching contour on the housing.

2. The covering according to claim 1, wherein said at least one spring device has two spring legs including a first spring leg supported on said inner side of said covering flap and a second spring leg supported on the housing of the luggage compartment covering.

3. The covering according to claim 1, wherein said covering flap having at least one latching element disposed on an inner side of said covering flap and, for locking said covering flap in the retracted position thereof, interacts with a mating latching element disposed on the housing of the luggage compartment covering.

4. The covering according to claim 3, wherein:
said latching element has a latching head; and
said mating latching element has a latching opening formed therein and at least one spring element which, when said covering flap is in the retracted position, engages behind said latching head of said latching element and therefore fixes said latching head in said latching opening.

5. The covering according claim 1, wherein said covering flap is formed from a same material as the housing of the luggage compartment covering.

6. The covering according to claim 3, wherein:
said at least one latching element has a latching head; and
said mating latching element has a latching opening formed therein.

7. A motor vehicle, comprising:
a rear seatback;
a luggage compartment covering having a housing, said housing having one of a latching groove and a latching contour formed therein;
a covering for covering a gap residing behind said rear seatback, said gap running in a transverse direction of the motor vehicle between said rear seatback and said luggage compartment covering, said covering including
at least one covering flap held in position on said housing of said luggage compartment covering, said covering flap having a hinge and mounted pivotably about said hinge, said covering flap, in a use position, bearing under prestress against said rear seatback;
an integrated receptacle for receiving said hinge of said covering flap, said integrated receptacle disposed on an upper, front region of said housing of said luggage compartment covering;
at least one spring device prestressing said covering flap in the use position thereof, said spring device being firstly supported on an inner side of said covering flap facing said luggage compartment covering in a retracted position of said covering flap, and secondly on said housing of said luggage compartment covering;
said covering flap bearing in the retracted position against said housing of said luggage compartment covering and being locked in the retracted position; and
said covering flap having a latching edge and, when said covering flap is in the retracted position, said latching edge one of engages in said latching groove on said housing and engages behind said latching contour on said housing.

* * * * *